Feb. 18, 1958   J. A. AMORI   2,823,717
SWINGING ROTARY KNIFE FRUIT HALVER
Filed April 23, 1956   2 Sheets-Sheet 1
FIG_1
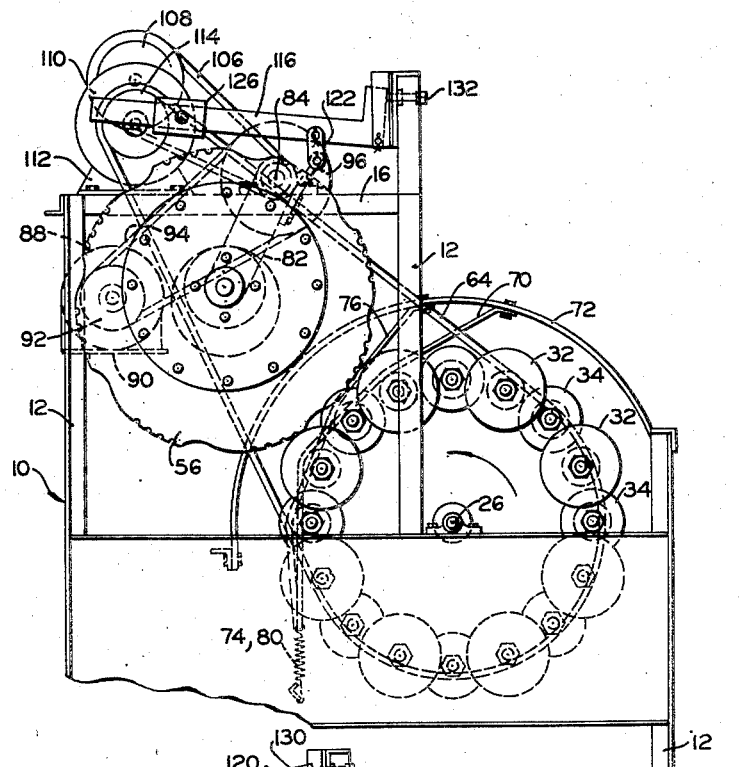
FIG_4
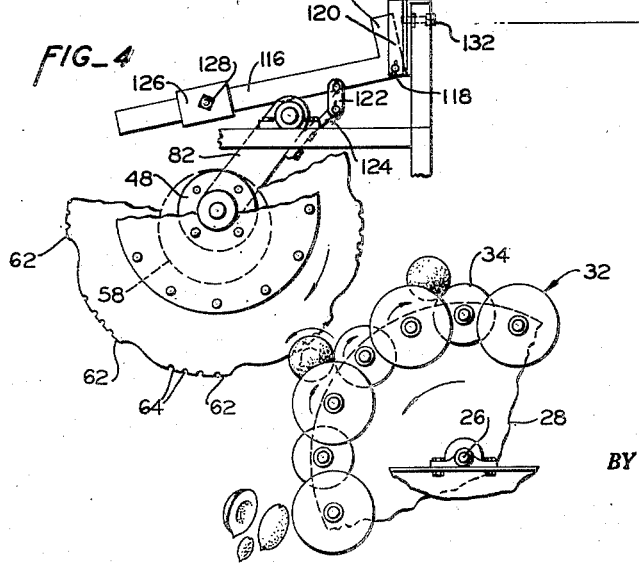
INVENTOR.
JOSEPH A. AMORI
BY
Naylor & Neal
ATTORNEYS Feb. 18, 1958 J. A. AMORI 2,823,717
SWINGING ROTARY KNIFE FRUIT HALVER
Filed April 23, 1956 2 Sheets-Sheet 2
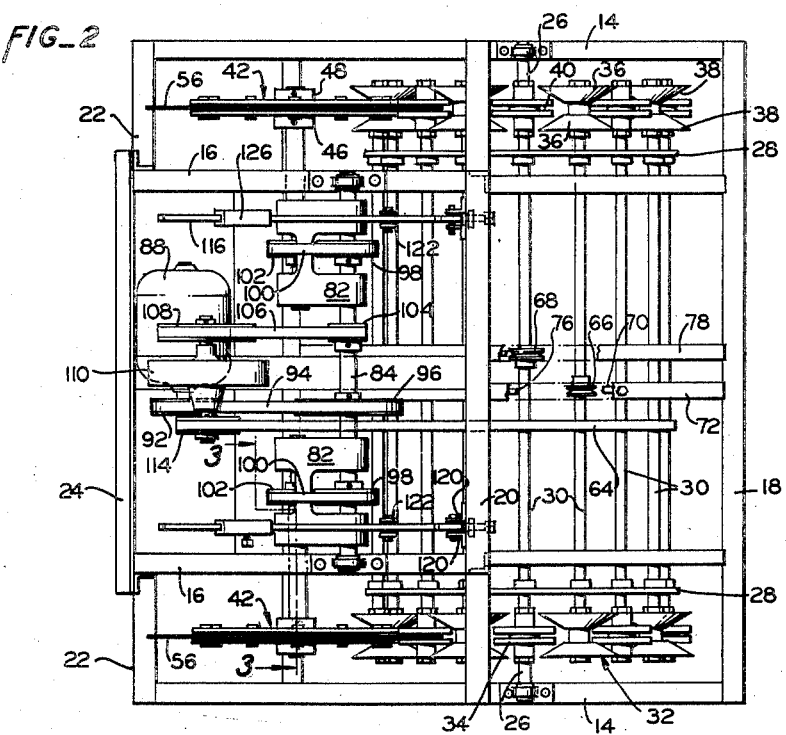
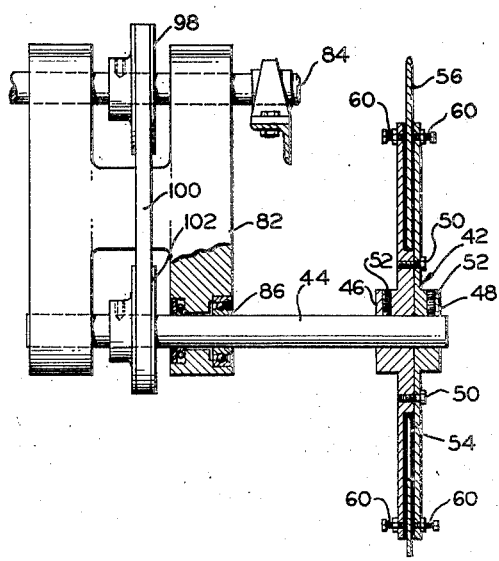
INVENTOR.
JOSEPH A. AMORI
BY
ATTORNEYS

United States Patent Office 2,823,717
Patented Feb. 18, 1958

2,823,717

SWINGING ROTARY KNIFE FRUIT HALVER

Joseph A. Amori, San Jose, Calif.

Application April 23, 1956, Serial No. 579,965

8 Claims. (Cl. 146—73)

This invention relates to food processing machinery, and more particularly to improvements in a semi-automatic machine adapted for the halving of fruit, such as apricots, peaches, and the like, which may be fed into the machine manually. Specifically, the present invention relates to improvements in the hand-fed fruit halving machine forming the subject matter of my United States Patent No. 2,703,126, issued March 1, 1955.

With relation to the machine forming the subject matter of my mentioned patent, the improvements therein constituting the subject invention relate to the fruit cutting, or knife portion, of the machine, as best exemplified in Figure 4 of said patent. The knives of my earlier machine were supported on hubs which had fixed centers of rotation. It is true that the knives were annular in form, being provided with hub-receiving apertures which were considerably over-sized with respect to the hubs, thereby permitting the knife blades to swing pendulum-like during rotation and upon encountering the fruit to be halved. There is, however, a practical limitation on the degree of over-size of the hub-receiving knife blade apertures, because the greater amount of free play there is between the knife blade and the hub the greater becomes the problem of rotating the blade and controlling it to maintain it in its vertical plane without the necessity of adding additional means to constrain the blade to its vertical plane by frictional engagement. Also, there is a further reason why there is a practical limitation to the amount of free play that may be allowed between the blade and the hub. The farther the blade tends to swing pendulum-like out of its normal operating attitude in response to the action of the fruit being cut, the greater is the weight component of the blade which is applied against the flesh of the fruit and the greater is the hammering action of the blade on both the fruit and the fruit pit. Thus, with large over-size fruit, such as the larger species of peaches, a mere increase in the degree of free play between the blade and the hub would not only tend to decrease the efficiency of operation of the knife blade but also tend to damage such fruit.

An object of the present invention is to improve my earlier machine so that it is adapted to halve fruit ranging in size from small plums and apricots to and including the largest size peaches without any damage to the fruit regardless of its condition of ripeness.

A further object of the invention is to, in effect, increase the degree of swingability of the knife blades with respect to the fruit being halved without either fixedly repositioning the knife blade hubs farther away from the orientation conveyor of the machine or increasing the degree of free play between the knife blades and hubs.

Still a further object of the invention is to achieve this additional degree of swingability of the knife blades by providing a pendulum-like support for the knife blade hubs, thereby constituting the blades as part of a compound pendulum system, i. e. wherein the blades may swing pendulum-like with respect to their hubs and wherein the hubs themselves may swing pendulum-like with respect to the frame of the machine.

And yet a further object of the invention is to embody means in association with the mounting system for the knife blade hubs to control the effective force with which the blades press against the fruit to be halved.

And still a further object of the invention is to provide adjustable counter balancing means in association with the mounting means for the knife blade hubs and knife blades, whereby the knife blades may be normally positioned in selected spaced relation with the orientation conveyor of the machine.

These and other objects and advantages of the invention will be apparent from the following description taken in conjunction with the drawings forming part of this specification, and in which:

Figure 1 is a view in side elevation of the improved machine embodying the invention;

Figure 2 is a top plan view of the machine of Figure 1;

Figure 3 is an enlarged detail view, partly broken away and partly in section, taken along lines 3—3 of Figure 2; and Figure 4 is a functional view in side elevation illustrating the mounting system for the knife blades and the manner of cooperation of the knife blades with the orientation conveyor.

Referring to the drawings for more specific details of the invention, the operating elements of the machine are mounted on a light weight support frame indicated generally at 10 and comprising legs 12, longitudinally disposed horizontal members 14 and 16, and transversely disposed horizontal members 18, 20, 22 and 24. Supported on the frame for rotation is a shaft 26 having fixedly secured thereto a pair of circular plates 28 which are interconnected for bracing purposes by a plurality of tie rods, not shown. Journalled for rotation in plates 28 is a plurality of shafts 30 having fixedly secured to their outer ends roller-type fruit orienting and conveying elements 32 and 34. The roller elements 32, which are disposed on alternate shafts 30, comprise truncated cones 36 disposed with their apices together to define V-shaped annular surfaces 38. The roller elements 34, which are likewise disposed on alternate shafts 30, are cylindrical in form and extend into the V-shaped channels of roller elements 32. The cylindrical rollers 34 are provided with centrally disposed slots 40 to enable their passage past the cutter blade hereinafter described.

A pair of knife blade assemblies indicated generally at 42 are carried by shafts 44 which are supported for rotation by means hereinafter described. With reference to Figure 4, the knife blade assemblies are caused to rotate in a clockwise direction. Each knife blade assembly comprises a pair of complemental annular members 46 and 48 secured together, as by bolts 50 and secured to a shaft 44, as by set screws 52. Member 46 is provided with a hub 54 which supports an annular knife blade 56 having a central hub-receiving aperture 58 which is considerably larger than hub 54. Adjustable bolt members 60 carried at the outer ends of members 46 and 48 extend through these members and into guide relation with blade 56 to prevent lateral wobbling of the blade during rotation. The outer, or cutting, edge of each blade 56 is irregular in form, as illustrated in Figures 1 and 4, being provided with spaced cutting portions 62 having notches 64.

The drum-like assembly of shafts 30 is caused to rotate in a counter-clockwise direction, with reference to Figure 1, by a continuous belt 64 which passes around the assembly of shafts 30 and is driven by means hereinafter described. The individual shafts 30 and the roller elements 32 and 34 carried thereby are caused to rotate in a clockwise direction, with reference to Figures 1 and 4, when the respective shafts 30 are disposed adjacent the cutter blades 56 and are no longer engaged by belt 64. For this purpose, the shafts 30 carrying roller elements 32 are provided with sheaves 66 which are fixedly secured thereto, and the shafts 30 carrying roller elements 34 are provided with sheaves 68 which are fixedly secured thereto. Sheaves 66 are adapted to be engaged by a friction belt 70 which extends from an arcuate frame member 72 to a spring 74 which is connected to the frame, and sheaves 68 are adapted to be engaged by friction belt 76 which extends from another arcuate frame member 78 to another spring 80 which is connected to the frame.

As thus far described, the machine is essentially identical with that forming the subject matter of my aforementioned patent.

Briefly, this machine operates in the following manner. The two operators of the machine hand-feed the fruit to be halved into the two banks of rollers, with a fruit being deposited in each roller pocket defined between a leading roller element 32 and a trailing roller element 34. The fruit are fed into these pockets with their suture lines being disposed in a vertical plane. The roller elements 32 and 34 do not rotate until sheaves 66 and 68 are engaged, respectively, by friction belts 70 and 76, at which time the roller elements are caused to rotate in the direction designated in Figure 4. Such rotation of the roller elements 32 and 34 of each fruit holding pocket causes the fruit itself to be rotated in a counter-clockwise direction, with reference to Figure 4, due to the fact that the rate of travel of the surfaces of the cylindrical roller elements 34 is greater than the rate of travel of the lesser diameter surface portions of roller elements 32 contacting the fruit. The knife blades 56 and the fruit being cut by the blades are thus rotating in the same direction at their lines of contact. The fruit are caused to make at least one complete revolution while they are being engaged by the knife blades 56, and thus the fruit are halved along their suture lines. When the blades 56 engage the fruit and the pits of the fruit, they tend to swing pendulum-like toward the left, with reference to Figure 4, and this action together with the tendency of the blades to return to their normal positions of operation imparts a slight hammering action to the pit of the fruit, resulting in disattachment of the pit from the fruit.

The present invention resides in the mounting system for the knife assemblies, whereby the shafts 44 carrying these two assemblies may likewise swing pendulum-like and whereby the pit freeing action of the blades may be controllably balanced. The shafts 44 are journalled for rotation in the lower ends of H-shaped hanger members 82, and said members 82 are in turn supported by shaft 84 which is supported for rotation by frame members 16. Bearing means 86 are provided in members 82 for both the shafts 44 and the shaft 84. Thus, the shafts 44 may rotate without imparting any frictional torque to the hanger members 82, and shaft 84 may likewise rotate without imparting any frictional torque to members 82.

Motor 88 supported on platform 90 secured to the frame drives sheave 92 to cause belt 94 to drive sheave 96 secured to shaft 84. The rotation of shaft 84 causes sheaves 98 carried thereby to drive belts 100, and belts 100 drive sheaves 102 which are fixedly secured to shafts 44. The assembly of shafts 30 is caused to rotate as a unit by means comprising: sheave 104 secured to shaft 84; belt 106; sheave 108; speed reducer 110 mounted on support means 112 secured to the frame; sheave 114; and belt 64.

As thus far described, it will be clear that there is a compound pendulum mounting system for the knife assemblies 42. That is to say, due to the oversize of knife openings 58 with respect to knife supporting hubs 54, the knife blades 56 may be swung pendulum-like with reference to hubs 54 under the action of the fruit engaged thereby, and the hubs 54 may be in turn swung pendulum-like with reference to shaft 84. The knife blade mounting system therefor adapts the knife blade assemblies to act upon larger fruit than they could act upon, within the limitations of the allowable ratio between the diameters of knife blade openings 58 and hubs 54, if shafts 44 were fixedly positioned as distinguished from being swingable. However, the weight of the double pendulum knife blade assemblies is sufficiently high to effectively prevent the fruit from swinging the assemblies outwardly, and means are therefor provided to controllably counter-balance the weights of these assemblies.

Such means comprise an elongated lever arm 116 which is pivotally attached at 118 to ears 120 secured to the frame. The lever arm 116 is connected by link 122 to an arm member 124 secured to hanger member 82, and the lever arm 116 is provided with a slidably adjustable weight 126 which may be selectively positioned on arm 116 by clamping bolt 128. The weighted lever arm tends to swing in a counter-clockwise direction, with reference to Figure 4, under the action of gravity and thereby tends to swing the knife assembly in a clockwise direction through the link connection 122—124. The weight of the knife assembly may be thus counter-balanced in whole or in part, and the knife assembly may be thus easily swung by the fruit.

Lever arm 116 is provided with a right angle extension 130 adapted to engage the end of a selectively positionable adjustment screw 132 to limit the degree to which the knife blade 56 may move toward the pocket conveyor.

What is claimed is:

1. In combination, a support frame, a knife blade, means mounting said blade for rotation in a vertical plane including a horizontally disposed rotatable shaft, hanger means pivotally connected to said support frame supporting said shaft for rotation and for swinging movement about a pivotal axis located above said shaft and disposed in parallel spaced relation with respect to said shaft, an elongated lever arm disposed above said hanger means having one end thereof pivotally connected to said support frame, the axes of pivotal connection between said hanger means and frame and between said lever arm and frame being offset from each other, and link means having a pivotal connection with said hanger and means with said lever arm at a point intermediate said one end of said lever and the other end of said lever, whereby said lever arm tends to swing said hanger means upwardly to raise said knife blade.

2. The combination set forth in claim 1, said lever arm having adjacent said other end thereof a selectively positionable weight member, whereby the thrust applied to said hanger means by said lever arm may be controllably varied.

3. The combination set forth in claim 2, said means for mounting said blade for rotation further including a central opening formed in said blade, a hub secured to said shaft and extending through said opening, said opening being of substantially greater diameter than said hub, and guide means carried by said hub adapted to constrain said blade to a vertical plane during rotation thereof, the claimed arrangement being such that said blade may be swung with respect to said hub in response to the forcing against said blade of an object to be cut thereby.

4. In combination, a support frame, a horizontally disposed first shaft and means for rotatably supporting the same on said frame, means mounted on said frame for rotating the shaft, hanger means depending from said shaft and pivotally mounted thereon, anti-friction bearing means interposed between said hanger means and said shaft, a second horizontally disposed shaft carried for rotation by said hanger means adjacent the lower end thereof, anti-friction bearing means interposed between said hanger means and said second shaft, a drive belt trained around sheaves secured to said shafts whereby said second shaft may be rotated by said first shaft, a hub secured on said second shaft and disposed in laterally spaced relation to said hanger means, an annular knife blade seated on said hub, said blade having a hub-receiving opening of substantially greater diameter than said hub, guide means carried by said hub adapted to constrain said blade to a vertical plane during rotation thereof, an elongated lever disposed above said first shaft and extending transversely thereof, said lever having a free end and having the other end thereof pivotally attached to said support frame, an arm member secured to one side of said hanger means and extending upwardly, a link disposed between said first shaft and the pivotally supported end of said lever arm, said link having its ends pivotally connected to the upper end of said arm member and to said lever arm, said lever arm being adapted upon downward movement of the free end thereof to swing said hanger means upwardly toward said free end of said lever arm.

5. The combination set forth in claim 4, said lever arm being provided with an adjustably positionable weight member, whereby the thrust applied to said hanger means by said lever arm may be controllably varied.

6. The combination set forth in claim 5, said lever arm having associated therewith adjustable stop means carried by said support frame, whereby through selective adjustment of said stop means said hanger means may be prevented from swinging downwardly past a predetermined inclined position.

7. In a fruit halving machine, the combination of a support frame, an annular knife blade, means mounted on said frame disposing said blade in a vertical plane including rotary means mounting the same for rotation and for limited pendulum-like swinging movement about said rotary means during rotation, and means carried by said frame supporting said rotary means for pendulum-like swinging movement.

8. In a fruit halving machine, the combination of a support frame, an annular knife blade, means mounted on said frame disposing said blade in a vertical plane including rotary means mounting the same for rotation and for limited pendulum-like swinging movement about said rotary means during rotation, means carried by said frame supporting said rotary means for pendulum-like swinging movement, and lever means pivotally supported by said frame and cooperatively disposed with said last-mentioned means adapted to urge said last-mentioned means to swing outwardly and upwardly in one direction.

References Cited in the file of this patent
UNITED STATES PATENTS

| | | |
|---|---|---|
| 1,566,151 | McDonough | Dec. 15, 1925 |
| 2,703,126 | Amori | Mar. 1, 1955 |

FOREIGN PATENTS

| | | |
|---|---|---|
| 243,057 | Switzerland | Dec. 2, 1946 |